US005487804A

United States Patent [19]

Thevenet et al.

[11] Patent Number: 5,487,804

[45] Date of Patent: Jan. 30, 1996

[54] METHOD ALLOWING THE INCORPORATION OF A METALLIC STRUCTURE INTO A PLASTIC

[75] Inventors: Bruno Thevenet, Lyons; Denis Gille, Bellignat, both of France

[73] Assignee: PROTECMA, France

[21] Appl. No.: 167,885

[22] PCT Filed: Apr. 20, 1993

[86] PCT No.: PCT/FR93/00385

§ 371 Date: Dec. 15, 1993

§ 102(e) Date: Dec. 15, 1993

[87] PCT Pub. No.: WO93/21367

PCT Pub. Date: Oct. 28, 1993

[51] Int. Cl.$^6$ .......... B32B 31/00

[52] U.S. Cl. .......... 156/148; 156/166; 156/309.9

[58] Field of Search .......... 428/253, 254, 428/256; 156/148, 166, 309.9

[56] References Cited

U.S. PATENT DOCUMENTS 4,381,421 4/1983 Coats et al. .......... 174/35 R 4,863,789 9/1989 Arai .......... 428/253

FOREIGN PATENT DOCUMENTS 0243193 10/1987 European Pat. Off. .

*Primary Examiner*—Christopher W. Raimund

*Attorney, Agent, or Firm*—Harris Beach & Wilcox

[57] ABSTRACT

Method allowing the incorporation of a metallic structure into a plastic with a view to producing molded articles, which consists, after having produced a fine knitted article, preferably a weft-knitted article, which is pliant so as to ensure deformability, in combining the said knitted fabric with a plastic sheet or film, and it is characterized in that the metal knitted fabric is combined immediately upon leaving the assembly allowing the formation of a plastic film or sheet, the combining being performed by calendering while the formed plastic sheet has not yet cooled down, thus allowing the inlaying of at least the surface of the said knitted structure into the said plastic sheet or film.

11 Claims, 1 Drawing Sheet

METHOD ALLOWING THE INCORPORATION OF A METALLIC STRUCTURE INTO A PLASTIC

BACKGROUND OF THE INVENTION

The present invention relates to an improved method allowing the incorporation of a metallic structure into a plastic with a view to producing molded articles; it also relates to a novel type of metallic structure particularly suited for the implementation of such a method as well as the molded articles including such a structure, and which have the characteristic of reflecting or barring electromagnetic waves and/or of being a good conductor of static electricity.

In the rest of the description, the term "plastic" will be used in the wide sense so as to designate any type of material such as, for example:

- thermoplastic materials like polyolefins (polyethylene, polypropylene), styrene-based materials (ABS, polystyrene, ASA, SAN), polyamides, thermoplastic polyesters (PET, PBT), polycarbonates, PMMAs (polymethyl methacrylate), PVC, etc., as well as the mixtures of these various materials (blends)
- thermosettable materials, like unsaturated polyesters, epoxies, polyurethanes, phenolics, etc.,
- elastomers like natural rubber, synthetic rubbers (SBR, nitrile rubber), thermoplastic elastomers (styrene-based, polyolefin-based, polyurethane-based or other thermoplastic elastomers) etc., which can be shaped by any type of process, such as, for example, injection molding, thermoforming, extrusion blow-molding, rotomolding, or other processes.

It is well known that, during the production by molding of articles based on plastics, it is possible to incorporate therein various additives and/or reinforcements, and this is done in order to confer on them specific properties.

Thus, in order to confer on them properties ensuring electromagnetic (EMI) or electrostatic (ESD) protection, it was proposed a long time ago to incorporate into such plastics various fillers, such as metal powders. However, such a procedure has very many drawbacks, among which it is possible to cite the difficulties of having a very homogeneous composition.

One solution to solve this problem consists in covering the molded part with a reflective surface layer, which solution is especially used for producing reflective assemblies (antennas, for example). However, such a surface coating has the drawback of being subjected to external attack, and therefore may deteriorate over time. Moreover, such techniques require for their implementation complex and expensive equipment and processes.

In order to overcome these drawbacks, it was proposed, and this emerges especially from U.S. Pat. No. 4,242,686, to incorporate into the molded article, especially during its production, an intermeshed metallic structure. Although this solution enables shaped articles to be obtained in which the conducting or reflective element is perfectly protected from external attack, it does not, however, produce assemblies of complex shape and/or of small thickness taking into account the fact that the metallic structure is in the shape of a tubular sleeve which lacks pliability, and which, during its implementation, is flattened when it is impregnated with the plastic resin. Moreover, it clearly emerges from this document that the incorporation can only be envisaged solely for the production of articles of the "laminated" type, in which the material is produced by successive layers and not for being implemented according to similar techniques of composite forming or overmolding.

It has also been proposed, in EP-A-0,243,193, to produce conductive sheets or films, optionally shaped by making use of a textile structure (woven or knitted fabric), constituted by a twisted composite yarn which includes conductive fibers and thermoplastic fibers which have a hot shrinkage greater than that of the said conductive fibers. Such a yarn has the characteristic that, during a heat treatment, a shrinkage of the thermoplastic fibers occurs in the axial direction, which makes the conductive fibers become spiralled around the said thermoplastic fibers.

However, such a solution has drawbacks, amongst which it is possible to cite:

- the shrinkage which leads to irregularity in the thermoplastic yarn meshwork,
- a "spiralled" deformation which leads to poor reflection of the waves and lower conductivity because of lack of contact.

In many applications (for example, for the production of molded protective caps for computer equipment), metal, especially stainless steel, assemblies are still used which have the drawbacks of being complicated to use, time-consuming to install, and have a high cost.

SUMMARY OF THE INVENTION

Now, a method has been found, and this forms the subject of the present invention, to incorporate a metallic structure into a plastic and this with a view to producing molded articles which can be of complex shape and/or finished articles, which overcomes the drawbacks of the prior solutions and which is, moreover, particularly suited for being implemented with a novel type of knitted metallic structure, which also forms part of the invention.

In a general manner, the method in accordance with the invention consists, after having produced a fine knitted article, preferably a weft-knitted article, which is pliant so as to ensure deformability, in combining the said knitted fabric with a plastic sheet or film, and is characterized in that the metal knitted fabric is combined immediately upon leaving the assembly allowing the formation of a plastic film or sheet, the combining being performed by calendering while the formed plastic sheet has not yet cooled down, thus allowing the inlaying of at least the surface of the said knitted structure into the said plastic sheet or film.

Such a procedure enables a composite to be produced which can be used as it is for producing a thermoformed part which can be used as it is or optionally can serve as an insert during a subsequent injection overmolding operation.

Although for the implementation of the method the use of yarns of any type, for example metal yarns of circular cross section, can be envisaged, it is advantageous, however, to use a novel type of metal structure, which also forms part of the invention, and which not only facilitates the implementation thereof but is particularly suited for obtaining an intermediate composite in which the mesh is perfectly secured to the plastic sheet or film during the extrusion of this sheet, this composite material being able to be used directly in order to obtain finished parts by thermoforming or, optionally, to be used as an insert during an overmolding operation or any other operation for producing plastic parts.

In a general manner, the novel type of knitted metallic structure, in accordance with the invention, and which is intended to be incorporated into molded articles based on plastic, is a hitted fabric produced according to the technique called "weft-hitting", and is characterized in that the yarn with which it is composed is a continuous metal yarn in the form of a line or strip, that is to say a material which, contrary to conventional yarns which have a circular cross section or which can be inscribed in a circle, have a substantially rectangular cross section, that is to say having a very small thickness compared to their width.

Advantageously, in practice, for the production of such a knitted fabric in accordance with the invention:

- a copper line or strip having a width lying between 0.3 mm and 1.5 mm and a thickness of from 0.001 mm to 0.003 mm will preferably be used as the metal yarn, this yarn preferably being silver plated in order to obtain better conductivity and reflection of the waves;
- the metal line or strip is preferably combined with a synthetic yarn which bonds easily to the thermoplastic material with which it will form a composite, using approximately 5 to 10% by weight of the metal yarn; in such a case, although the use of textile strips or lines presheathed with plastics can be envisaged, it is advantageous to produce such a combination on the same hitting machine, by hitting the two filamentary elements (synthetic yarn and metal), in a plated pattern, that is to say making it possible to have superposition of two elementary yarns in the knitted fabric formed, and this is done in such a way that one of the faces of said knitted fabric consists for the most part of yarns of one type (metal), whereas the other face, for its part, consists for the most part of synthetic yarns; the synthetic yarn can be of the same type as the plastic, ensuring good bonding to the component of the thermoplastic sheet; moreover, it is possible to use an extensible yarn, such as, for example, a textured yarn or a highly elastic yarn, such as those marketed under the LYCRA trademark or similar products, which makes it possible to cause the meshwork to shrink and leads to a denser knitted fabric upon leaving the machine;
- a knitting pattern will be used which is either a pattern of the plain-hitting type or, preferably, a pattern enabling weft float-loops to be obtained by means of tuck loops, so as to have a highly deformable structure.

BRIEF DESCRIPTION OF THE DRAWINGS

The invention and the advantages which it provides will, however, be better understood by virtue of the exemplary embodiment given hereinbelow by way of indication, but this not being limiting, and which is illustrated by the appended diagrams in which.

DETAILED DESCRIPTION OF THE INVENTION

Referring to the appended diagrams, the invention therefore relates to a method which allows the incorporation of the metallic structures into a plastic, and this is done with a view to producing molded articles.

Figure 1:
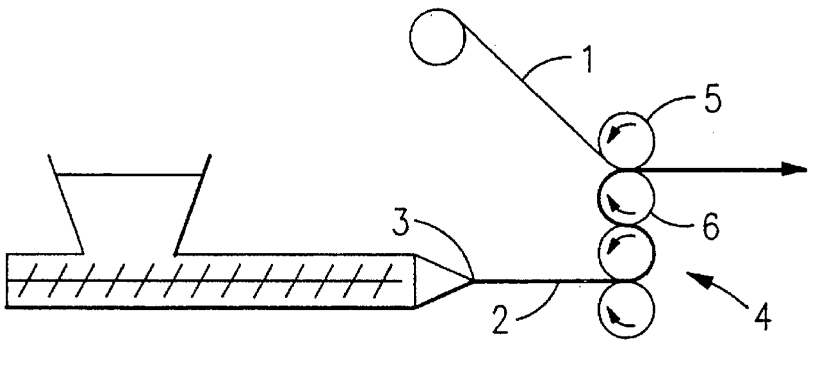
FIG. 1 is a diagrammatic view, in elevation, of an overall installation allowing the implementation of the method in accordance with the invention.

In accordance with the invention and as emerges from FIG. 1, after having produced a fine knitted article (1), preferably on a weft-hitting machine according to a preferential embodiment which forms part of the invention, as will be seen in the rest of the description, the said knitted fabric (1), laid flat, is combined with a plastic sheet or film (2). In accordance with the invention, the metal knitted fabric (1) is combined immediately upon leaving the assembly allowing the formation of the plastic film or sheet (2). This combining is performed by calendering while the formed plastic sheet has not yet cooled down, which thus allows the inlaying of at least the surface of the said knitted structure (1) into the plastic sheet or film (2). By way of indication, it is thus possible to produce, by extrusion through a flat die (3), a sheet or film of plastic of ABS type, the exit conduit of which is one millimeter in thickness. Upon exiting the extruder die, the sheet formed has a temperature of approximately 200° C. After passing into the calendering assembly (4) which enables the final thickness of the sheet to be imparted, and before the latter has cooled down, the intermeshed structure (1) is brought into contact with the surface of the sheet (2), these two elements being combined between the two rolls (5, 6) of the calender (4). By virtue of such an installation, a sheet or film is obtained which can either be cut up, or wound up in the form of a reel.

Figure 2:
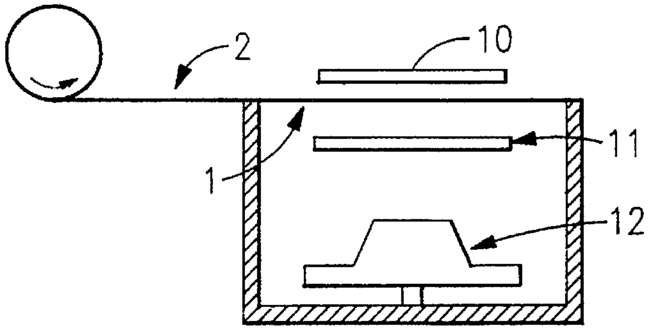
FIG. 2 illustrates the manner in which a thermoformed finished part is produced directly from a structure produced in accordance with the method according to the invention; according to the invention.
Figure 3:
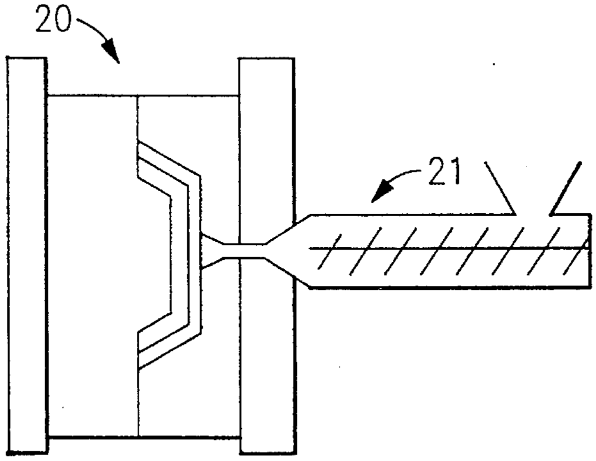
FIG. 3 illustrates the manner in which an insert, produced in accordance with the method in accordance with the invention, is used for an injection overmolding operation.

Such a sheet can be used for producing completely finished parts directly by thermoforming, as illustrated in FIG. 2, or, optionally, for serving as an insert, thermoformed beforehand, used during an overmolding/injection operation as represented in FIG. 3.

When a thermoforming operation is carried out, the sheet or film consisting of the plastic/knitted-fabric composite is brought between two heater assemblies, respectively the upper and lower heater assemblies (10, 11). After raising the temperature of the sheet and removing the heater assemblies (10, 11), a contraction-cavity-forming operation is carried out making it possible to render the thicknesses homogeneous. After this operational phase, the molding operation proper is performed by raising the ram (12) and applying suction. After cooling, the molded assembly is cut out. During this molding operation, the face of the composite which includes the metal mesh is preferably arranged on the inside of the product. By such a technique, it is possible to produce finished products directly, such as, for example, parabolic antennas, casings.

Optionally, after the thermoforming operation, it is possible to use the part as an insert during an overmolding operation, as illustrated in FIG. 3, the said insert being arranged inside a mold (20) of suitable shape and the plastic being injected via a conventional assembly (21) into the mold.

Although, as stated previously, any type of pliant and deformable weft-knitted metal fabric can be used for the implementation of such a method, it will be preferable to use a novel type of knitted structure, which also forms part of the invention, and which is produced from continuous metal yarns which are in the form of a line or strip, for example a copper line or strip having a width lying between 0.3 mm and 1.5 mm and a thickness of from 0.001 to 0.003 mm. This yarn is preferably silver plated. During the production of the knitted fabric, the metal line or strip is combined with a plastic yarn (synthetic yarn), the two elements being combined on the same knitting machine, thereby producing the knitted fabric in a plaited pattern, which pattern can be either of the plain-knitting type or, optionally, may include weft float-loops obtained by means of tuck loops.

By way of indication, a hitted structure produced in the following manner is particularly suited for the implementation of the method.

On a weft-knitting circular knitting machine, of the "sinker-wheel" type, having a coarse 18 gauge (18 needles in a Saxon inch or 23.6 mm), an intermeshed structure in accordance with the invention is produced by knitting, in a plaited crepon pattern (one row plain-hitting pattern, one row tuck-loop pattern), two yarns brought simultaneously into each row, one being constituted by a copper yarn in the form of an NM32 (31.25 tex) line, the other by a 45 dtex polyamide yarn. Knitting in plaiting form makes it possible to obtain a hitted fabric, one of the faces of which consists for the major part of metal line yarns which mask the polyamide yarns which are located on the other face of the said hitted fabric. Upon leaving the machine, such an article weighs 75 g/m$^2$ and can be used, either for being incorporated directly into plastics during a molding operation or, preferably, in accordance with the method according to the invention, for producing an intermediate product which itself can either be used directly to produce a finished part or to serve as an insert during an overmolding operation.

The molded articles including such a metallic structure on one face or embedded into the plastic can be used for all applications in which it is desired to obtain EMI-ESD protection.

Compared to the prior solutions, such a solution has many advantages because the meshwork can be easily arranged, matches the deformation of the plastic during the molding, deformation of the mesh up to 300% in both directions. In addition, such a product makes it possible to produce stepped imbricated mold-parting lines, whence an effective barrier to the waves and reliable grounding. In addition, the laminated surface of the yarn leads to sharp edges allowing better penetration into the surfaces of plastics. Finally, the articles produced can be recycled easily, the plastic reinforced by such a structure not being polluting contrary to plastics which are filled with metal fibrils or powders, or which are simply coated with a superficial coating layer.

Of course, the invention is not limited to the exemplary embodiment described above, but it encompasses all the variants thereof which are produced within the same scope, and/or specifically a thermoformable flat product with addition of a web of metal, stainless steel, pure and silver-plated copper, knitted fabric which can be incorporated into an assembly according to various methods of converting resins.

We claim:

1. A method of producing a molded article having electromagnetic and electrostatic properties that includes the steps of providing a conductive metal yarn having a rectangular cross section such that the width of the yarn is about between 300 and 500 times its thickness;

providing a thermoplastic yarn;

knitting both yarns together into a plaited pattern on the same weft knitting machine to form a composite fabric wherein the metal yarn forms about 5% to 10% by weight of the composite fabric, said fabric being highly deformable in all directions, and said fabric having a top face and a bottom face such that one face primarily consists of metal yarn and the other face primarily consists of thermoplastic yarn;

heat forming a sheet of plastic;

calendering the fabric with the plastic sheet while the sheet is still in a heated state to at least partially implant one face of the fabric into a surface of said sheet, and molding the fabric implanted sheet into an article having a complex shape whereby the deformable fabric faithfully follows the contour of the complex shaped article.

2. The method of claim 1 that further includes the step of silver plating the metal yarn.

3. The method of claim 1 wherein the face of the fabric that consists primarily of thermoplastic yarn is implanted into the surface of said sheet.

4. The method of claim 1 wherein the composite fabric contains tuck loops to enhance its deformability.

5. The method of claim 1 that includes the further step of overmolding the fabric implanted surface of the article with a plastic overcoat.

6. The method of claim 1 wherein the metal yarn has a width of between 0.30 and 1.5 mm and a thickness of between 0.001 and 0.003 mm.

7. The method of claim 1 wherein the metal yarn is copper.

8. A method of producing a moldable sheet having electromagnetic and electrostatic properties that includes the steps of:

providing a conductive metal yarn having a rectangular cross section;

knitting the metal yarn into a weft-knitted fabric on a weft knitting machine so that the fabric contains tuck loops, wherein the fabric has top and bottom faces and is highly deform able in all directions, heat forming a sheet of plastic, and calendering the metal fabric with the sheet of plastic while the sheet is in a heated state to embed at least one face of the fabric in a surface of said sheet, and allowing the fabric imbedded sheet to cool.

9. The method of claim 8 that includes the further step of molding the fabric embedded sheet into an article having a complex contour whereby the fabric faithfully follows the contour of the article.

10. The method of claim 8 that includes the further step of knitting a plastic yarn with the metal yarn to form a composite fabric having about 5 to 10% by weight metal yarn.

11. The method of claim 8 wherein the metal yarn is copper having a width of between 0.30 and 1.5 mm and a thickness of between 0.001 and 0.003 mm.

* * * * *